US012656490B2

(12) United States Patent
Wu et al.

(10) Patent No.: US 12,656,490 B2
(45) Date of Patent: Jun. 16, 2026

(54) LARGE-SCALE AND HIGH-PRECISION ABSOLUTE DISTANCE MEASUREMENT SYSTEM BASED ON ALL-FIBER FEMTOSECOND LASER

(71) Applicant: Beijing Changcheng Institute of Metrology & Measurement, AVIC, Beijing (CN)

(72) Inventors: Tengfei Wu, Beijing (CN); Jibo Han, Beijing (CN); Yu Bai, Beijing (CN); Lei Zhang, Beijing (CN); Linjie Lv, Beijing (CN); Xinliang Li, Beijing (CN)

(73) Assignee: Beijing Changcheng Institute of Metrology & Measurement, AVIC, Beijing (CN)

( * ) Notice: Subject to any disclaimer, the term of this patent is extended or adjusted under 35 U.S.C. 154(b) by 868 days.

(21) Appl. No.: 18/054,827

(22) Filed: Nov. 11, 2022

(65) Prior Publication Data

US 2023/0074319 A1 Mar. 9, 2023

(30) Foreign Application Priority Data

Nov. 24, 2021 (CN) .......................... 202111425981.0

(51) Int. Cl.
*G01S 17/10* (2020.01)
*G01S 7/481* (2006.01)

(52) U.S. Cl.
CPC ............ *G01S 17/10* (2013.01); *G01S 7/4818* (2013.01)

(58) Field of Classification Search
None
See application file for complete search history.

(56) References Cited

U.S. PATENT DOCUMENTS

| | | | | |
|---|---|---|---|---|
| 2011/0285980 A1* | 11/2011 | Newbury | ................ | G01S 7/484 |
| | | | | 356/3 |
| 2013/0077084 A1* | 3/2013 | Liu | ......................... | G01S 17/10 |
| | | | | 356/5.03 |
| 2024/0036170 A1* | 2/2024 | Kim | ...................... | G01S 7/4972 |

FOREIGN PATENT DOCUMENTS

| | | | | |
|---|---|---|---|---|
| CN | 107764189 A | 3/2018 | | |
| CN | 113805189 A | 12/2021 | | |
| KR | 102010123 B1 * | 8/2019 | ......... | H01S 5/06216 |

* cited by examiner

*Primary Examiner* — Eric L Bolda

(57) ABSTRACT

A large-scale and high-precision absolute distance measurement system based on an all-fiber femtosecond laser, including: a first all-fiber femtosecond laser, a second all-fiber femtosecond laser, a fiber optic splitter, a first fiber optic circulator, a wavelength division multiplexer, an achromatic fiber collimator, a first fiber optic combiner, a second fiber optic combiner, a second fiber optic circulator, a semiconductor laser, a first photodetector, a second photodetector, and a data acquisition and processing module.

3 Claims, 1 Drawing Sheet

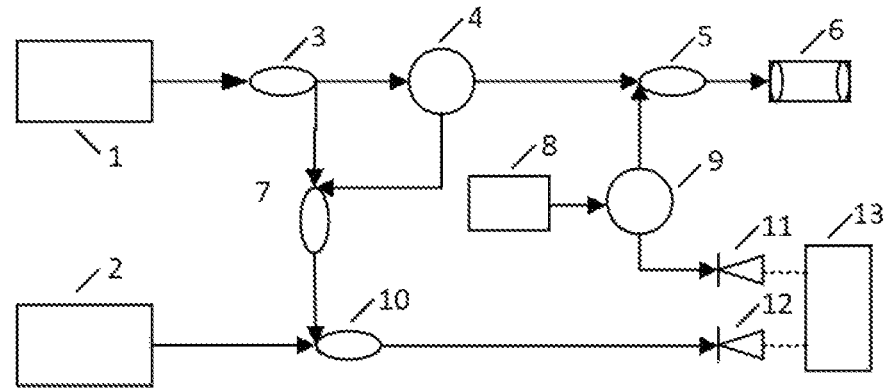

LARGE-SCALE AND HIGH-PRECISION ABSOLUTE DISTANCE MEASUREMENT SYSTEM BASED ON ALL-FIBER FEMTOSECOND LASER

CROSS-REFERENCE TO RELATED APPLICATIONS

This application claims the benefit of priority from Chinese Patent Application No. 202111425981.0, filed on Nov. 24, 2021. The content of the aforementioned application, including any intervening amendments thereto, is incorporated herein by reference in its entirety.

TECHNICAL FIELD

This application relates to laser ranging, and more particularly to a large-scale and high-precision absolute distance measurement system based on an all-fiber femtosecond laser.

BACKGROUND

Femtosecond pulsed laser is characterized by wide spectrum, narrow pulse, and high peak energy, and its stability in the time and frequency domain can be greatly improved after locking its repetition frequency and carrier envelope phase to a highly-stable external rubidium clock at the same time, forming a femtosecond optical frequency comb. The femtosecond optical frequency comb has been extensively applied to the high-precision absolute distance measurement, such as incoherent-coherent combined ranging, time-of-flight (TOF) ranging, multi-wavelength laser interferometry-based ranging, spectral interferometry ranging, cross-correlation-based ranging, synthetic-wavelength based ranging, and dual femtosecond laser ranging (DFLR).

Compared to the traditional laser ranging methods, the dual femtosecond laser ranging approach has advantages of high precision, excellent measurement efficiency, and no measurement dead zones, and can realize the high-precision absolute distance measurement, exhibiting brilliant application prospects in the large-scale measurement calibration, long-distance mapping, and large-scale equipment assembly. Unfortunately, regarding the traditional DFLR methods, it is necessary to adjust the repetition frequency of the femtosecond lasers for another measurement to calculate the absolute distance, which leads to complicated operation, thereby limiting its practical application.

SUMMARY

In view of the deficiencies in the prior art, this application provides a large-scale and high-precision absolute distance measurement system based on an all-fiber femtosecond laser, which combines advantages of the DFLR technology and the phase ranging technology, and has a large measurement range (more than 100 m), excellent ranging accuracy (sub-micron level), and high measurement speed (kHz), enabling the fast absolute distance measurement. Moreover, this application also has fast update, and simple operation.

Technical solutions of this application are described as follows.

In a first aspect, this application provides an all-fiber femtosecond laser-based absolute distance measurement system, including:
  a dual femtosecond laser ranging unit; and
  a phase laser ranging unit.

In an embodiment, the all-fiber femtosecond laser-based absolute distance measurement system, including:
  a first all-fiber femtosecond laser;
  a second all-fiber femtosecond laser;
  a fiber optic splitter;
  a first fiber optic circulator;
  a wavelength division multiplexer;
  an achromatic fiber collimator;
  a first fiber optic combiner;
  a second fiber optic combiner;
  a second fiber optic circulator;
  a semiconductor laser;
  a first photodetector;
  a second photodetector; and
  a data acquisition and processing module;
  wherein the first all-fiber femtosecond laser and the second all-fiber femtosecond laser are configured to emit a femtosecond pulsed laser for the dual femtosecond laser ranging unit; a repetition frequency of the first all-fiber femtosecond laser is greater than that of the second all-fiber femtosecond laser; a central wavelength of the first all-fiber femtosecond laser is the same as that of the second all-fiber femtosecond laser; and a repetition frequency difference between the first all-fiber femtosecond laser and the second all-fiber femtosecond laser depends on a measurement speed;
  the semiconductor laser is configured to emit a laser for the phase laser ranging unit, and a central wavelength of the laser emitted by the semiconductor laser falls into visible-light wavelength range; and the laser emitted by the semiconductor laser is configured to be coupled into a fiber through a column lens or an aspheric lens;
  the fiber optic splitter is configured to split the femtosecond pulsed laser emitted by the first all-fiber femtosecond laser into a reference light beam and a measurement light beam;
  the first fiber optic circulator is a three-port circulator, wherein a first port of the first fiber optic circulator is configured for input of the measurement light beam; a second port of the first fiber optic circulator is configured for output of the measurement light beam; and a third port of the first fiber optic circulator is configured for output of a returned measurement light beam;
  the wavelength division multiplexer is configured to perform combination and splitting of a dual femtosecond ranging measurement light and a phase ranging measurement light; and the wavelength division multiplexer has three ports;
  the achromatic fiber collimator is configured to perform common-path transmission of the dual femtosecond ranging measurement light and the phase ranging measurement light, and receive a returned dual femtosecond ranging measurement light and a returned phase ranging measurement light; and the achromatic fiber collimator is operated at the central wavelength of the first all-fiber femtosecond laser and the central wavelength of the laser emitted by the semiconductor laser;
  the first fiber optic combiner is configured to combine the reference light beam with the returned measurement light beam;
  the second fiber optic combiner is configured to combine the femtosecond pulsed laser emitted by the second all-fiber femtosecond laser, the reference light beam and the returned measurement light beam;
  the second fiber optic circulator is a three-port circulator, wherein a first port of the second fiber optic circulator is configured for input of the phase ranging measurement light; a second port of the second fiber optic circulator is configured for output of the phase ranging measurement light; and a third port of the second fiber optic circulator is configured for output of the returned phase ranging measurement light;

the first photodetector is configured to detect a dual femtosecond laser ranging signal and carry out photoelectric conversion on the dual femtosecond laser ranging signal to obtain a first electrical ranging signal;

the second photodetector is configured to detect a phase ranging signal and carry out photoelectric conversion on the phase ranging signal to obtain a second electrical ranging signal; and the data acquisition and processing module is configured to collect and process the first electrical ranging signal and the second electrical ranging signal, and display a distance measurement result.

In an embodiment, central wavelengths of the first all-fiber femtosecond laser and the second all-fiber femtosecond laser are both 1560 nm;

the central wavelength of the laser emitted by the semiconductor laser is 635 nm;

the three ports of the wavelength division multiplexer are a 1560 nm port, a 635 nm port, and a common port, respectively; and the achromatic fiber collimator is operated at 1560 nm and 635 nm.

This application further provides an absolute distance measurement method using the all-fiber femtosecond laser-based absolute distance measurement system above, including:

(a) emitting, by the first all-fiber femtosecond laser, a first femtosecond pulsed laser to the fiber optic splitter; splitting, by the fiber optic splitter, the first femtosecond pulsed laser into a reference light beam and a measurement light beam; allowing the measurement light beam to enter the first fiber optic circulator through the first port of the first fiber optic circulator, and leave the first fiber optic circulator through the second port of the first fiber optic circulator to enter the wavelength division multiplexer through the 1560 nm port; outputting the measurement light beam from the common port of the wavelength division multiplexer to the achromatic fiber collimator; outputting, by the achromatic fiber collimator, the measurement light beam to a measurement target to be reflected by the measurement target; receiving and returning, by the achromatic fiber collimator, a reflected measurement light beam to the common port of the wavelength division multiplexer; allowing the reflected measurement light beam to pass through the wavelength division multiplexer and the first fiber optic circulator, and outputting the reflected measurement light beam from the third port of the first fiber optic circulator; combining, by the first fiber optic combiner, the reflected measurement light beam with the reference light beam followed by outputting; emitting, by the second all-fiber femtosecond laser, a second femtosecond pulsed laser with a central wavelength of 1560 nm as a scanning light, wherein a repetition frequency of the second all-fiber femtosecond laser is less than a repetition frequency of the first all-fiber femtosecond laser; combining, by the second fiber optic combiner, the scanning light emitted by the second all-fiber femtosecond laser with the reference light beam and the reflected measurement light beam output by the first fiber optic combiner followed by outputting to the first photodetector; and detecting, by the first photodetector, a dual femtosecond laser ranging signal followed by transmission to the data acquisition and processing module;

(b) emitting, by the semiconductor laser, a continuous visible laser with a central wavelength of 635 nm; allowing the continuous visible laser to enter the second fiber optic circulator through the first port of the second fiber optic circulator and leave the second fiber optic circulator through the second port of the second fiber optic circulator to enter the wavelength division multiplexer through the 635 nm port; outputting the continuous visible laser from the common port of the wavelength division multiplexer to the achromatic fiber collimator; outputting, by the achromatic fiber collimator, the continuous visible laser to the measurement target to be reflected by the measurement target; receiving and returning, by the achromatic fiber collimator, a reflected visible laser to the common port of the wavelength division multiplexer; allowing the reflected visible laser to pass through the wavelength division multiplexer and the second fiber optic circulator followed by outputting from the third port of the second fiber optic circulator to the second photodetector; and detecting, by the second photodetector, a phase ranging signal followed by transmission to the data acquisition and processing module;

(c) collecting and processing, by the data acquisition and processing module, the dual femtosecond laser ranging signal and the phase ranging signal, and displaying an absolute distance; wherein an non-ambiguity range of dual femtosecond laser ranging is limited by the repetition frequency of the first all-fiber femtosecond laser, and the repetition frequency of the first all-fiber femtosecond laser is $f_r$; a measurement speed depends on the repetition frequency difference between the first all-fiber femtosecond laser and the second all-fiber femtosecond laser, and the repetition frequency difference is $\Delta f_r$; the non-ambiguity of the dual femtosecond laser ranging is expressed as $cf_r/2n$, wherein the measurement speed is $\Delta f_r$; c is light speed; and n is refractive index of air;

a distance measured by the dual femtosecond laser ranging unit is $d_1$ with a measurement precision of submicron order, and $d_1$ is less than ($cf_r/2n$);

a distance measured by the phase laser ranging unit is $d_2$ with a measurement precision of millimeter level;

$d_2/(cf_r/2n)$ is rounded down to get an integer N; and the absolute distance is calculated as follows:

$$d = N \times \frac{cf_r}{2n} + d_1.$$

Compared to the prior art, this application has the following beneficial effects.

1. In the all-fiber femtosecond laser-based absolute distance measurement system provided herein, the dual femtosecond laser ranging unit has the advantages of high measurement accuracy and fast measurement speed; and the phase laser ranging unit enables the visible light-based long-distance measurement. The semiconductor visible laser phase ranging method plays a role as an effective supplement to the dual femtosecond laser absolute distance measurement, such that the large-scale high-precision absolute distance measurement can be achieved without adjusting the repetition frequency. This application has a large measurement range (more than 100 m), excellent ranging accuracy (sub-micron level), and high measurement speed (kHz).

2. An achromatic fiber collimator is adopted to enable the common-path emission, transmission and receiving of the femtosecond laser and the visible laser, improving the system stability, and overcoming the defect in the traditional dual femtosecond laser ranging system that it is necessary to adjust the repetition frequency. Moreover, the measurement error caused by the spatial beam combining is eliminated, and the measurement precision is enhanced.

3. The absolute distance measurement system adopts an all-fiber structure and does not require debugging, allowing for improved reliability and practicability.

BRIEF DESCRIPTION OF THE DRAWINGS

The FIGURE schematically shows a structure of an all-fiber femtosecond laser-based absolute distance measurement system according to one embodiment of the present disclosure.

In the FIGURE: 1—first all—fiber femtosecond laser; 2—second all—fiber femtosecond laser; 3—fiber optic splitter; 4—first fiber optic circulator; 5—wavelength division multiplexer; 6—achromatic fiber collimator; 7—first fiber optic combiner; 8—semiconductor laser; 9—second fiber optic circulator; 10—second fiber optic combiner; 11—second photodetector; 12—first photodetector; and 13—data acquisition and processing module.

DETAILED DESCRIPTION OF EMBODIMENTS

The disclosure will be described in detail below in conjunction with the drawing and embodiments to make objects and advantages of the disclosure clearer.

Provided herein is an all-fiber femtosecond laser-based absolute distance measurement system, which includes a first all-fiber femtosecond laser 1, a second all-fiber femtosecond laser 2, a fiber optic splitter 3, a first fiber optic circulator 4, a wavelength division multiplexer 5, an achromatic fiber collimator 6, a first fiber optic combiner 7, a second fiber optic combiner 10, a second fiber optic circulator 9, a semiconductor laser 8, a first photodetector 12, a second photodetector 11, and a data acquisition and processing module 13. In the FIGURE, optical fiber members are connected by optical fiber flange or splicing optical fiber, and the photodetectors and data acquisition and processing module are connected by BNC signal line.

The absolute distance measurement method using the all-fiber femtosecond laser-based absolute distance measurement system is described as follows.

(a) The first all-fiber femtosecond laser 1 emits a first femtosecond pulsed laser with a central wavelength of 1560 nm, and then the first femtosecond pulsed laser enters the fiber optic splitter 3 to be split into the reference light beam (10%) and the measurement light beam (90%). The measurement light beam enters the first fiber optic circulator 4 through the first port of the first fiber optic circulator 4, leaves the first fiber optic circulator 4 through the second port of the first fiber optic circulator 4 to enter the wavelength division multiplexer 5 through the 1560 nm port, and outputs the measurement light beam from the common port of the wavelength division multiplexer 5 to the achromatic fiber collimator 6. The achromatic fiber collimator 6 outputs the measurement light beam to a measurement target to be reflected by the measurement target. The reflected measurement light beam is received and returned by the achromatic fiber collimator 6 to the common port of the wavelength division multiplexer 5, passes through the wavelength division multiplexer 5 and the first fiber optic circulator 4, and outputs from the third port of the first fiber optic circulator 4. Then the reflected measurement light beam outputting from the third port of the first fiber optic circulator 4 is combined with the reference light beam through the first fiber optic combiner 7 followed by outputting. The second all-fiber femtosecond laser 2 emits a second femtosecond pulsed laser with a central wavelength of 1560 nm as a scanning light. A repetition frequency of the scanning light is slightly less than a repetition frequency of the first all-fiber femtosecond laser 1. The reference light beam and the reflected measurement light beam output by the first fiber optic combiner 7 and the scanning light emitted by the second all-fiber femtosecond laser 2 are combined by the second fiber optic combiner 10 followed by outputting to the first photodetector 12. The first photodetector 12 detects and sends a dual femtosecond laser ranging signal to the data acquisition and processing module 13.

(b) The semiconductor laser 8 emits a continuous visible laser with a central wavelength of 635 nm. The continuous visible laser enters the second fiber optic circulator 9 through the first port of the second fiber optic circulator 9 and leaves the second fiber optic circulator 9 through the second port of the second fiber optic circulator 9 to enter the wavelength division multiplexer 5 through the 635 nm port. The continuous visible laser outputs from the common port of the wavelength division multiplexer 5 to the achromatic fiber collimator 6 and reaches to the measurement target to be reflected by the measurement target. The reflected visible laser is received and returned by the achromatic fiber collimator 6 to the common port of the wavelength division multiplexer 5, passes through the wavelength division multiplexer 5 and the second fiber optic circulator 9, outputs from the third port of the second fiber optic circulator 9, and enters the second photodetector 11 to detect and send the phase ranging signal to the data acquisition and processing module 13.

(c) The data acquisition and processing module 13 collects and processes the dual femtosecond laser ranging signal and the phase ranging signal and displays an absolute distance. A non-ambiguity range of the dual femtosecond laser ranging is limited to the repetition frequency of the first all-fiber femtosecond laser 1, and the repetition frequency of the first all-fiber femtosecond laser 1 is $f_r$. A measurement speed depends on the repetition frequency difference between the first all-fiber femtosecond laser 1 and the second all-fiber femtosecond laser 2, and the repetition frequency difference is $\Delta f_r$. The non-ambiguity range of the double femtosecond laser ranging is $cf_r/2n$, where c is light speed, and n is refractive index of air.

A distance measured by the dual femtosecond laser ranging unit is $d_1$ with a measurement precision of submicron order, and $d_1$ is less than $(cf_r/2n)$.

A distance measured by the phase laser ranging unit is $d_2$ with a measurement precision of millimeter level.

$d_2/(cf_r/2n)$ is rounded down to get an integer N.

The absolute distance is calculated as follows:

$$d = N \times \frac{cf_r}{2n} + d_1.$$

Therefore, the large-scale and high-precision absolute distance measurement is realized by combining the double-femtosecond laser ranging technology and phase ranging technology.

Described above are merely preferred embodiments of the disclosure, which are not intended to limit the disclosure. It should be understood that any modifications, variations and replacements made by those skilled in the art without departing from the spirit of the disclosure should fall within the scope of the disclosure defined by the appended claims.

What is claimed is:

1. An all-fiber femtosecond laser-based absolute distance measurement system, comprising:

a dual femtosecond laser ranging unit;

a phase laser ranging unit;

a first all-fiber femtosecond laser;

a second all-fiber femtosecond laser;

a fiber optic splitter;

a first fiber optic circulator;

a wavelength division multiplexer;

an achromatic fiber collimator;

a first fiber optic combiner;

a second fiber optic combiner;

a second fiber optic circulator;

a semiconductor laser;

a first photodetector;

a second photodetector; and a data acquisition and processing module;

wherein the first all-fiber femtosecond laser and the second all-fiber femtosecond laser are configured to emit a femtosecond pulsed laser beam for the dual femtosecond laser ranging unit; a repetition frequency of the first all-fiber femtosecond laser is greater than that of the second all-fiber femtosecond laser; a central wavelength of the first all-fiber femtosecond laser is the same as that of the second all-fiber femtosecond laser; and a repetition frequency difference between the first all-fiber femtosecond laser and the second all-fiber femtosecond laser depends on a measurement speed;

the semiconductor laser is configured to emit a laser beam for the phase laser ranging unit, and a central wavelength of the laser beam emitted by the semiconductor laser falls into visible-light wavelength range; and the laser beam emitted by the semiconductor laser is configured to be coupled into a fiber through a column lens or an aspheric lens;

the fiber optic splitter is configured to split the femtosecond pulsed laser beam emitted by the first all-fiber femtosecond laser into a reference light beam and a measurement light beam;

the first fiber optic circulator is a three-port circulator, wherein a first port of the first fiber optic circulator is configured for input of the measurement light beam; a second port of the first fiber optic circulator is configured for output of the measurement light beam; and a third port of the first fiber optic circulator is configured for output of a returned measurement light beam;

the wavelength division multiplexer is configured to perform combination and splitting of a dual femtosecond ranging measurement light and a phase ranging measurement light; and the wavelength division multiplexer has three ports;

the achromatic fiber collimator is configured to perform common-path transmission of the dual femtosecond ranging measurement light and the phase ranging measurement light, and receive a returned dual femtosecond ranging measurement light and a returned phase ranging measurement light; and the achromatic fiber collimator is operated at the central wavelength of the first all-fiber femtosecond laser and the central wavelength of the laser beam emitted by the semiconductor laser;

the first fiber optic combiner is configured to combine the reference light beam with the returned measurement light beam;

the second fiber optic combiner is configured to combine the femtosecond pulsed laser beam emitted by the second all-fiber femtosecond laser, the reference light beam and the returned measurement light beam;

the second fiber optic circulator is a three-port circulator, wherein a first port of the second fiber optic circulator is configured for input of the phase ranging measurement light; a second port of the second fiber optic circulator is configured for output of the phase ranging measurement light; and a third port of the second fiber optic circulator is configured for output of the returned phase ranging measurement light;

the first photodetector is configured to detect a dual femtosecond laser ranging signal and carry out photoelectric conversion on the dual femtosecond laser ranging signal to obtain a first electrical ranging signal;

the second photodetector is configured to detect a phase ranging signal and carry out photoelectric conversion on the phase ranging signal to obtain a second electrical ranging signal; and the data acquisition and processing module is configured to collect and process the first electrical ranging signal and the second electrical ranging signal, and display a distance measurement result.

2. The all-fiber femtosecond laser-based absolute distance measurement system of claim 1, wherein central wavelengths of the first all-fiber femtosecond laser and the second all-fiber femtosecond laser are both 1560 nm;

the central wavelength of the laser beam emitted by the semiconductor laser is 635 nm;

the three ports of the wavelength division multiplexer are a 1560 nm port, a 635 nm port, and a common port, respectively; and the achromatic fiber collimator is operated at 1560 nm and 635 nm.

3. An absolute distance measurement method using the all-fiber femtosecond laser-based absolute distance measurement system of claim 2, comprising:

(a) emitting, by the first all-fiber femtosecond laser, a first femtosecond pulsed laser beam to the fiber optic splitter; splitting, by the fiber optic splitter, the first femtosecond pulsed laser beam into a reference light beam and a measurement light beam; allowing the measurement light beam to enter the first fiber optic circulator through the first port of the first fiber optic circulator, and leave the first fiber optic circulator through the second port of the first fiber optic circulator to enter the wavelength division multiplexer through the 1560 nm port; outputting the measurement light beam from the common port of the wavelength division multiplexer to the achromatic fiber collimator; outputting, by the achromatic fiber collimator, the measurement light beam to a measurement target to be reflected by the measurement target; receiving and returning, by the achromatic fiber collimator, a reflected measurement light beam to the common port of the wavelength division multiplexer; allowing the reflected measurement light beam to pass through the wavelength division multiplexer and the first fiber optic circulator, and outputting the reflected measurement light beam from the third port of the first fiber optic circulator; combining, by the first fiber optic combiner, the reflected measurement light beam with the reference light beam followed by outputting; emitting, by the second all-fiber femtosecond laser, a second femtosecond pulsed laser beam with a central wavelength of 1560 nm as a scanning light, wherein a repetition frequency of the second all-fiber femtosecond laser is less than a repetition frequency of the first all-fiber femtosecond laser; combining, by the second fiber optic combiner, the scanning light emitted by the second all-fiber femtosecond laser with the reference light beam and the reflected measurement light beam output by the first fiber optic combiner followed by outputting to the first photodetector; and detecting, by the first photodetector, a dual femtosecond laser ranging signal followed by transmission to the data acquisition and processing module;

(b) emitting, by the semiconductor laser, a continuous visible laser beam with a central wavelength of 635 nm; allowing the continuous visible laser beam to enter the second fiber optic circulator through the first port of the second fiber optic circulator and leave the second fiber optic circulator through the second port of the second fiber optic circulator to enter the wavelength division multiplexer through the 635 nm port; outputting the continuous visible laser beam from the common port of the wavelength division multiplexer to the achromatic fiber collimator; outputting, by the achromatic fiber collimator, the continuous visible laser beam to the measurement target to be reflected by the measurement target; receiving and returning, by the achromatic fiber collimator, a reflected visible laser beam to the common port of the wavelength division multiplexer;

allowing the reflected visible laser beam to pass through the wavelength division multiplexer and the second fiber optic circulator followed by outputting from the third port of the second fiber optic circulator to the second photodetector; and detecting, by the second photodetector, a phase ranging signal followed by transmission to the data acquisition and processing module;

(c) collecting and processing, by the data acquisition and processing module, the dual femtosecond laser ranging signal and the phase ranging signal, and displaying an absolute distance; wherein a non-ambiguity range of dual femtosecond laser ranging is limited by the repetition frequency of the first all-fiber femtosecond laser, and the repetition frequency of the first all-fiber femtosecond laser is $f_r$; a measurement speed depends on the repetition frequency difference between the first all-fiber femtosecond laser and the second all-fiber femtosecond laser, and the repetition frequency difference is $\Delta f_r$; the non-ambiguity range of the dual femtosecond laser ranging is expressed as $cf_r/2n$, wherein c is light speed; and n is refractive index of air;

a distance measured by the dual femtosecond laser ranging unit is $d_1$ with a measurement precision of submicron order, and $d_1$ is less than $(cf_r/2n)$;

a distance measured by the phase laser ranging unit is $d_2$ with a measurement precision of millimeter level;

$d_2/(cf_r/2n)$ is rounded down to get an integer N; and the absolute distance is calculated as follows:

$$d = N \times \frac{cf_r}{2n} + d_1.$$

* * * * *